(12) United States Patent
Walters et al.

(10) Patent No.: US 12,240,715 B2
(45) Date of Patent: Mar. 4, 2025

(54) SYSTEM AND METHOD FOR UNLOADING A SHIPPING CONTAINER

(71) Applicant: Wombat Timbers Pty Ltd., Wetherill Park (AU)

(72) Inventors: Donald Jeffrey Walters, Wetherill Park (AU); Becky Jane Walters, Wetherill Park (AU)

(*) Notice: Subject to any disclaimer, the term of this patent is extended or adjusted under 35 U.S.C. 154(b) by 325 days.

(21) Appl. No.: 18/048,938

(22) Filed: Oct. 24, 2022

(65) Prior Publication Data

US 2024/0132307 A1 Apr. 25, 2024
US 2024/0228199 A9 Jul. 11, 2024

(51) Int. Cl.
B65G 67/24 (2006.01)
B64F 1/32 (2006.01)
B65G 13/12 (2006.01)
B65G 39/12 (2006.01)

(52) U.S. Cl.
CPC .......... B65G 67/24 (2013.01); B64F 1/32 (2013.01); B65G 13/12 (2013.01); B65G 39/12 (2013.01)

(58) Field of Classification Search
CPC . B64F 1/32; B64F 1/322; B65G 67/24; B65G 639/12; B65G 13/12
See application file for complete search history.

(56) References Cited

U.S. PATENT DOCUMENTS

| | | | |
|---|---|---|---|
| 3,169,652 A * | 2/1965 | Ewell | B65G 67/20 414/373 |
| 3,595,407 A | 7/1971 | Muller-Kuhn et al. | |
| 3,819,068 A | 6/1974 | Weir | |
| 4,230,044 A * | 10/1980 | Rohrig | B65D 19/0022 198/867.14 |
| 4,457,424 A * | 7/1984 | Wuensch | B65G 67/20 414/400 |
| 4,907,933 A * | 3/1990 | Kressly | B65G 67/24 414/334 |
| 2010/0296902 A1 | 11/2010 | Aschpurwis et al. | |
| 2018/0141012 A1 | 5/2018 | Lucas et al. | |
| 2018/0186582 A1 | 7/2018 | Borders et al. | |
| 2019/0009998 A1 * | 1/2019 | Viinonen | B65G 67/20 |
| 2024/0051762 A1 * | 2/2024 | Aitto-Oja | B65G 67/24 |

FOREIGN PATENT DOCUMENTS

| | | |
|---|---|---|
| EP | 2563697 B1 | 2/2018 |
| EP | 3345833 A1 | 7/2018 |
| WO | 2015140404 A1 | 4/2015 |
| WO | 2017187017 A1 | 11/2017 |
| WO | 2017211263 A1 | 12/2017 |

* cited by examiner

*Primary Examiner* — Kaitlin S Joerger
(74) *Attorney, Agent, or Firm* — Andrew H. Berks (57) ABSTRACT

A system and method for unloading palletized cargo from an intermodal shipping container is provided, including a platform of conveyer rollers and a winch with a motor and cable connected to a hook. The hook may have prongs with grappling hooks that can be attached to a pallet at the base and can pull the pallet from the container onto the platform where the pallet can be picked up with a forklift. The platform can be adjusted to the height of the floor of the container. The hook may have a V-shape with two arms with grappling hooks at the distal end of each arm and a bolt in the apex to control the spreading of the arms.

8 Claims, 7 Drawing Sheets

SYSTEM AND METHOD FOR UNLOADING A SHIPPING CONTAINER

FIELD OF THE INVENTION

The invention relates to a system and method for unloading palletized cargo from an intermodal shipping container without the need for a loading dock, the need for a ramp, or the need to remove the container from a truck trailer.

BACKGROUND

Intermodal cargo containers are standardized shipping containers, designed and built for intermodal freight transport, meaning these containers can be used across different modes of transport—from ship to rail to truck—without unloading and reloading their cargo. Intermodal containers exist in many types and a number of standardized sizes, but ninety percent of the global container fleet are so-called "dry freight" or "general purpose" containers, comprising durable closed steel boxes, mostly of either twenty or forty feet (6.1 or 12.2 m) standard length, 8-ft (2.44 m) wide, and 8 feet 6 inches (2.6 m) or 9 feet 6 inches (2.9 m) high. Intermodal containers normally have a single pair of doors at one end.

Typically, intermodal containers are shipped long distances by sea or by rail, and then transferred to trucks for transport from a seaport or rail head to a final location, where the cargo will be unloaded. The containers are typically loaded onto special truck trailers adapted for transporting intermodal containers. Ideally, a container can be unloaded without moving the container off the trailer.

Intermodal cargo containers are generally loaded and unloaded either fully manually or with the help of lateral guide belts or a forklift. Palletized cargo, meaning bags or boxes stacked on a pallet, are usually unloaded using a forklift. This presents a problem of how to drive a forklift into a container. A forklift generally requires the cargo to be unloaded on a loading dock. An alternative is lowering the container to the ground or using a "yard ramp" with a level off to allow the forklift to climb up to the container door and pick up the pallets. Efforts have been made to optimize the palletized cargo handling systems by using conveyors, which transport the cargo from the cargo container to the forklift.

WO2017187017 discloses an apparatus for loading cargo, which has a stacker for stacking the goods, a buffer conveyor, a transfer conveyor and a conveyor. The goods are stacked and then advanced to the cargo space from the conveyor to a transfer plate. Once the load is in the cargo space, it is supported by a gate so that the transfer plate can be removed underneath. The loading device descends in the direction of the cargo space and is operated by gravity.

U.S. Pat. No. 3,819,068A discloses a boom conveyor for loading and unloading cargo from/to container to/from a loading dock. The boom conveyor is pivotally mounted at both ends and has a cantilevered end portion which extends into the container.

U.S. Pat. No. 3,595,407 provides for a crane apparatus and movable pallet system for unloading and sorting of airfreight containers, which requires a transloading installation aligned with the airplane, which are provided with roller-equipped platforms.

EP3150522A1 discloses a device for transferring loads from the chassis of a vehicle by a motor driven continuous conveyor to a roller conveyor. The motor of the continuous conveyor is activated when two switches come into contact with the help of a lifting table.

EP 3 345 833 A1 describes a cargo handling system configured to load and unload cargo containers, which includes parallel roller tracks and a mobile cargo mover located in the space between the tracks. The cargo mover has at least one conveyor extending from the housing and cargo couplers which couple the mover to the cargo and moves the cargo on the roller tracks.

WO 2015/140404 A1 provides for a system for loading a cargo space to protect the loads and the structure of the cargo space from being damaged while loading. A transfer apparatus, having a transfer element, which moves into a cargo space along with the cargo stacked on it and moves out of while the units remain in the cargo space. While uploading the units, the apparatus forms a protective wall between the cargo and the structure defining the cargo space.

US2010/0296902A1 discloses an apparatus for loading and unloading units, such as swap bodies with stackable articles using a pallet permanently assigned to the loading unit and a mechanism for displacing the pallet, which is arranged on the loading unit or on the door of the loading unit.

For cargo on pallets in shipping containers, the use of a forklift to unload the container is the most preferred method. However, this presents the problem of either having a loading dock at the destination, which may not be convenient, or using some other cumbersome method of lowering the container to the ground or using an awkward ramp or both.

SUMMARY OF THE INVENTION

This invention provides a system and method for mechanically unloading a large palletized load from an intermodal container on a truck trailer without the use of a loading dock, and without the need to lower the container to the ground or use an ungainly ramp. The shipping container can remain on a truck trailer, typically used to transport the container to a work site, during this entire operation.

In an embodiment, this invention provides a system having an apparatus and method for unloading palletized cargo from an intermodal shipping container. The system and method use a platform having conveyer rollers, wherein the platform has a proximal edge in contact with the shipping container with doors open. The rollers are aligned parallel to the proximal edge, so that cargo can be pulled out of the container and will roll away from the doors on the conveyer rollers.

In an embodiment, the platform is on jacks (also termed adjustable legs), for example four jacks, i.e., a jack for each leg. The jacks can be adjusted such that the platform is level and the rollers are at the exact height of the floor of the container, which is desirable so the pallets can be pulled out of the container as smoothly possible.

In an embodiment, the system and method includes a winch, which includes a cable, rope, or chain winding around a horizontal rotating drum, turned by a motor that can pull the cable towards the motorized drum. The winch is positioned on the distal edge of the platform, i.e., away from the container.

In an embodiment, the winch cable is connected to a two-prong hook that attaches (grapples) to each side of the base of a pallet in the interior of the shipping container at or near the floor level. When the winch is activated, the cable pulls the pallet from the container onto the rollers of the platform.

Once the pallet is on the platform, it can be picked up with a forklift that drives up to the platform.

In an embodiment, the hook has a V-shape with a distal end pointed away from the winch, and a proximal end pointed towards and the winch. The hook may have two prongs forming the V-shape with grappling hooks at the distal end of each prong, and a pivot at an apex of the V shape.

In an embodiment, the prongs of the hook are inserted into the base of the pallet and the hook is expanded (spread) so that the grappling hooks of each prong grab a base member of the pallet. The winch can then be activated to pull the pallet out of the container and onto the rollers of the platform.

In an embodiment, the hook further comprises an adjustable bolt that controls the expansion and contraction (spreading) of the prongs.

In an embodiment, the platform is equipped with wheels and can be towed into position. Alternatively, the platform is moved into position with a forklift.

DETAILED DESCRIPTION

In an embodiment, this invention provides a system and method for unloading palletized cargo from an intermodal shipping container, which includes a platform comprising conveyer rollers, a hook which can attach to a pallet and pull the pallet from the container onto the platform using a winch with a motor and cable connected to the hook. The platform can be adjusted to the height of the floor of the shipping container so that the pallet can be pulled on to the platform and picked up with a forklift when cleared from the shipping container. The hook may have a V-shape, where each arm of the hook grapples the base of a pallet. This system allows pallets to be removed from the interior of a shipping container where the pallet can be easily picked up with a forklift.

Unlike any of the existing apparatuses and methods, the present invention addresses the problem of unloading shipping containers containing palletized cargo which is normally moved with a forklift, without the need to dock the container to a loading dock, or use an awkward ramp, or lower the container to the ground. Shipping containers are typically transported from a seaport or rail yard to a work site by a truck trailer adapted to transport intermodal shipping containers. In this invention, the shipping (intermodal) container is not removed from the truck trailer.

The invention is intended to provide for a new type of apparatus to facilitate the handling of large palletized cargo units packed in intermodal shipping containers. This invention provides apparatus and methods which are relatively compact, not labor intensive and easy to install, maintain and operate. The system disclosed in the present invention allows for unloading large containers. As much as the entire contents of a shipping container can be extracted from the interior of the container in one operation.

Figure 1:
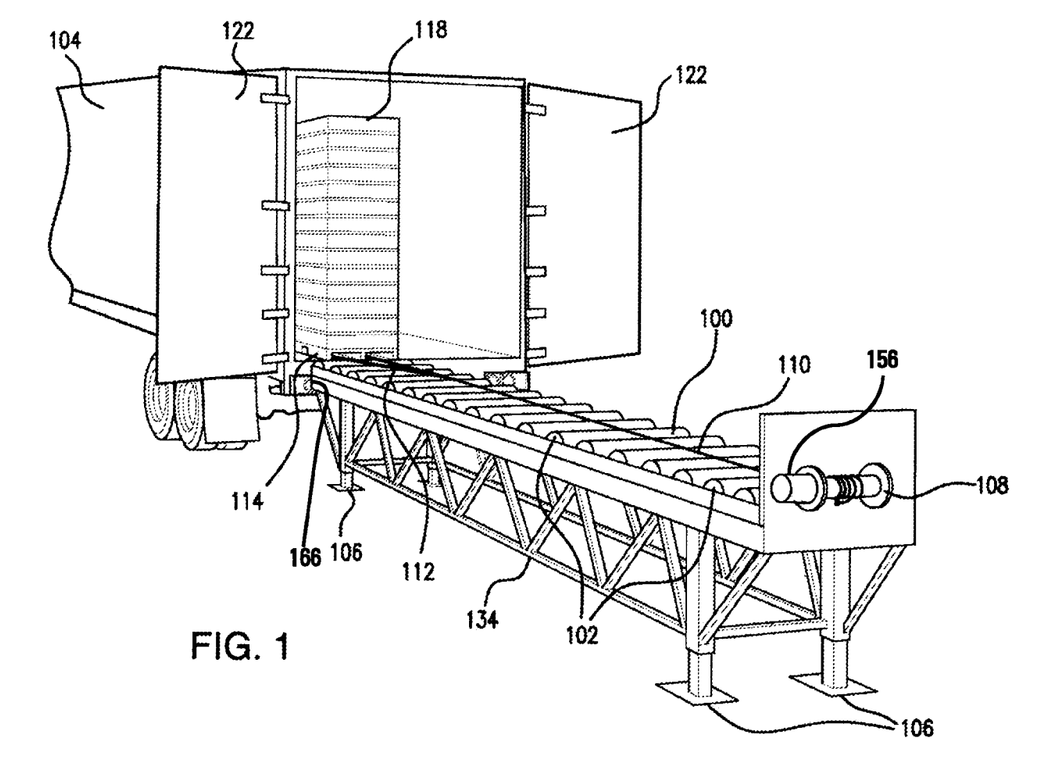
FIG. 1 shows a perspective view of the system in operation. The platform backed up to an open shipping container is shown, with cargo on a pallet being extracted from the container using the inventive method with the hook, cable, and winch.

FIG. 1 is a schematic illustration of a perspective view of the unloading system according to an embodiment of the present invention, comprising a platform 100 with conveyer rollers 102, with the proximal edge 166 of the platform aligned in contact with or close to the shipping container 104. The doors 122 of the shipping container are shown in the open position. In an alternative embodiment the platform is full width of the container. The conveyer rollers 102 are parallel to the proximal edge 166.

In an embodiment, the platform 100 has plurality of jacks 106 (adjustable legs), which allow the platform 100 to be adjusted to the exact height of the floor of shipping container 104 and leveled. In an embodiment, the jacks 106 may be mechanical or hydraulic. Typically, four jacks will be used, one for each corner of the roller platform. Ideally, the entire apparatus of the platform and shipping container will be approximately level. In an embodiment, the platform 100 is supported with truss system 134 that provides significant rigidity and strength to the platform.

After platform is in position and at the correct height, a latching system may be provided to secure edge 166 to the shipping container and prevent its movement during the inventive cargo extraction operation.

The system further comprises a winch 108 equipped with a motor 156, which may be a hydraulic or electric motor, and a cable 110. The winch 108 may be positioned on the distal edge (with respect to the shipping container) of the platform 100 and the cable 110 is connected to a two-prong hook 112 (FIG. 5) having grappling hooks 128 that engage each side of the base support 116 of a pallet base 114 (FIG. 7) at the floor level so that the winch cable 110 pulls the palletized cargo 118 from the shipping container 104 onto the platform 100. The cable 110 can be a steel cable rope, chain or the like.

Figure 2:
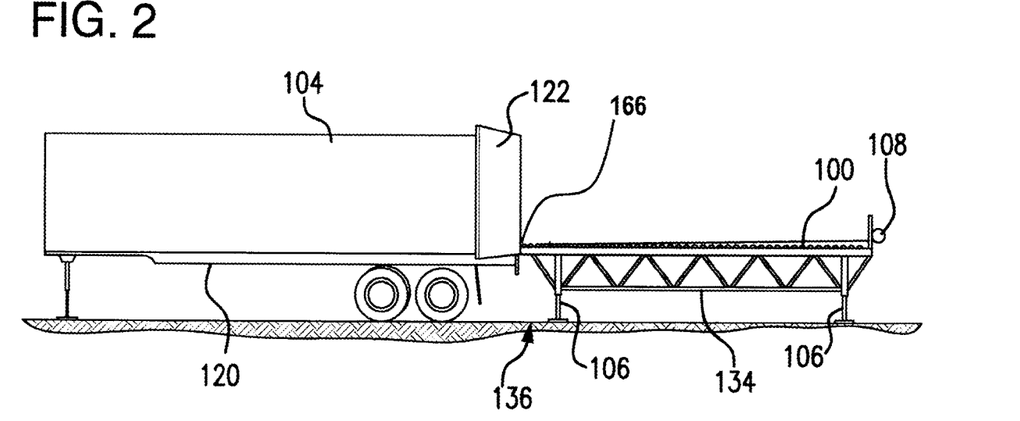
FIG. 2 shows an elevation view of an embodiment of the present invention with the platform positioned adjacent to the cargo container door at the appropriate height.
Figure 3:
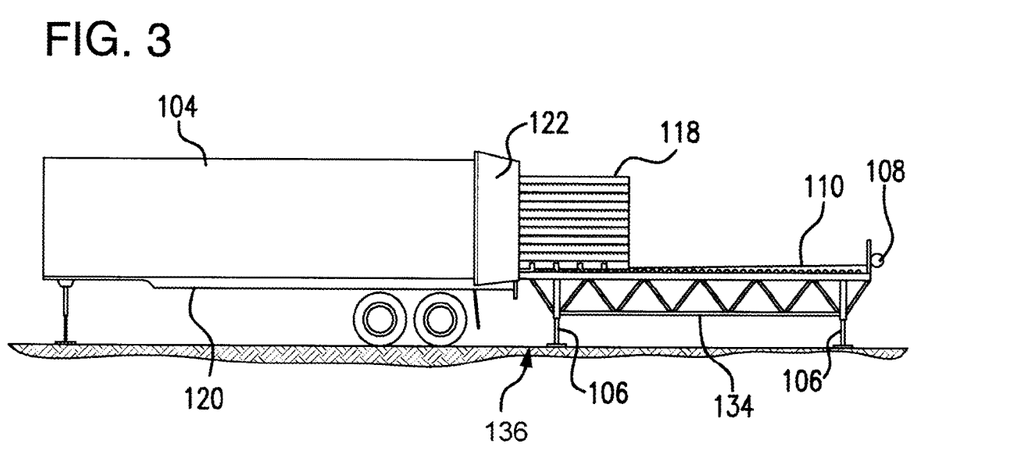
FIG. 3 shows an elevation view of an embodiment of the invention with the palletized cargo partially pulled onto the platform by the winch.
Figure 4:
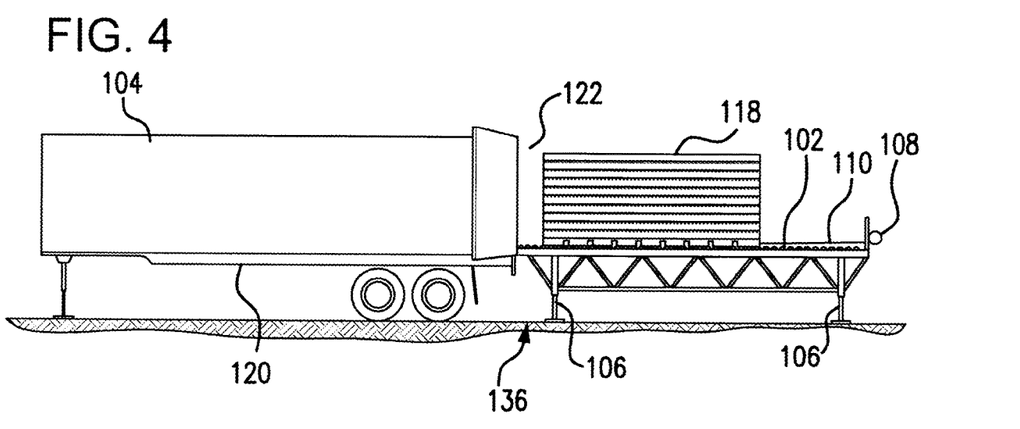
FIG. 4 shows an elevated view of an embodiment of the present invention with the platform positioned adjacent to the cargo container's door with the palletized cargo completely pulled out of the cargo container onto the platform.

FIGS. 2-4 show elevation views of the system in operation. FIG. 2 shows the system with the platform 100 positioned in contact with the shipping container 104 shown on a trailer 120, with the height of the platform 100 adjusted to the height of the shipping container floor at the open door 122 of the shipping container. At this point in the process, the cable and hook (not shown in this view) would be unreeled from the winch and connected to a pallet inside the container so that grappling hooks 128 engage a base member of the pallet as discussed herein. The trailer 120, with a shipping container 104 thereon, and the platform are stationary on the ground 136, i.e., a work area where the container is being unloaded.

In FIG. 3 the winch has been activated and the palletized cargo 118 partially pulled out by the winch cable 110.

In FIG. 4 the cargo 118 is fully extracted from the shipping container 104 onto the rollers 102 of platform 100. At this point, the palletized cargo 118 is ready to be picked up by a forklift. The system disclosed in the present invention allows for unloading large containers and even half or the entire content (for large pallets) of the shipping container 104 in one extraction operation.

Figure 5:
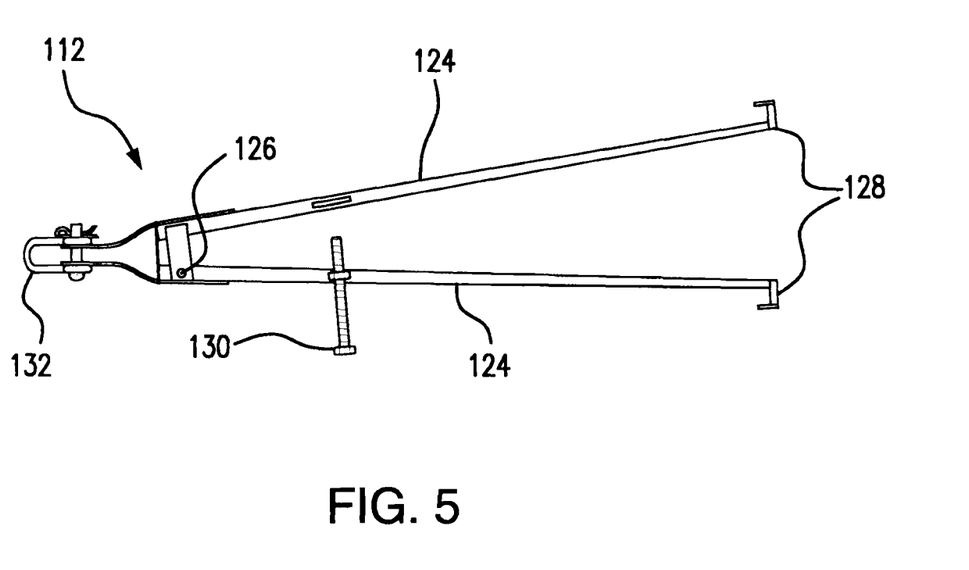
FIG. 5 shows a top view of the hook assembly in accordance with one embodiment of the present invention.

FIG. 5 shows a top view of the two-prong V-shaped hook 112 according to an embodiment of the present invention with two prongs 124 (also termed "arms" herein), a pivot 126 at the apex of the V-shape, a grappling hook 128 at the distal end of each arm 124 to attach to the pallet base 116, an adjustable bolt 130 that controls the spreading of the arms 124 and a loop 132 to which a cable or a rode can be easily attached. The prongs are inserted into the pallet in a relatively contracted state, with a smaller degree of spread, and the prong angle is expanded, i.e., with a larger spread angle, to engage the grappling hooks with the base of the pallet.

The arms of the V-hook must be sufficiently long to reach to the center of a pallet. For example, if the pallet is 10 feet long (about 3 meters), the arms must be about 7 feet long (about 2.2 meters) to easily reach to the center of the pallet on the long axis. An example used by the instant inventors is for a pallet for a partially finished lumber product that is 5.6 m long. The arms of the hook embodiment for that pallet are 2.8 m long.

Figure 6:
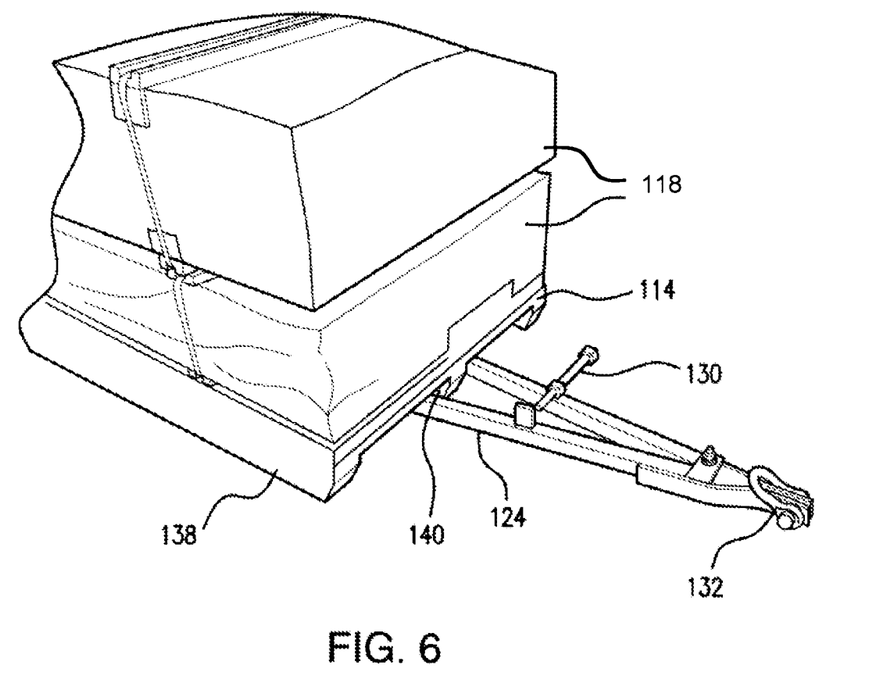
FIG. 6 shows the hook being inserted into a pallet.

FIG. 6. Shows a perspective view of the hook being inserted into the base of a pallet. Pallet interior support 140 and pallet walls 138 are shown. This shows how the hook is inserted around the center support 140.

Figure 7:
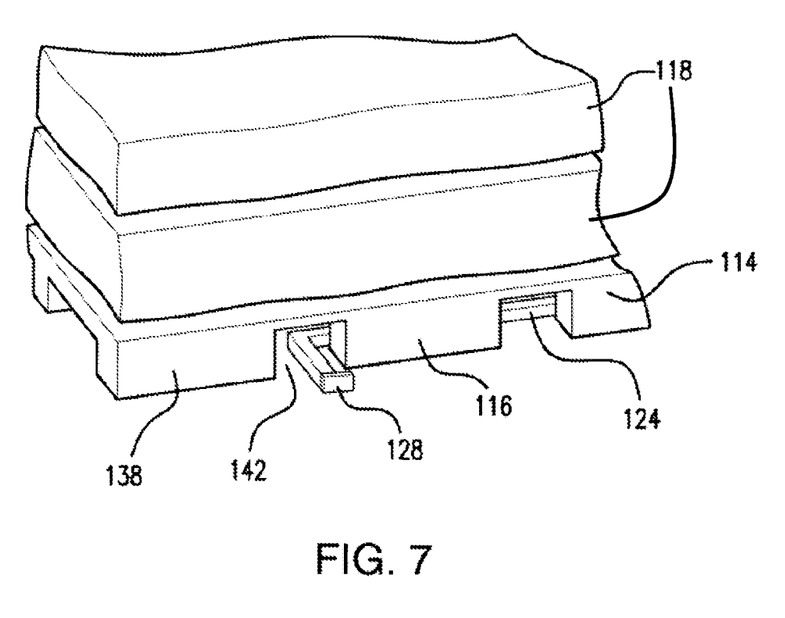
FIG. 7 shows an exploded partial view of the hook in relation to the floor of the pallet prior to engaging the pallet base.

FIG. 7 shows an exploded view of the hook prongs 128 attached to the base support 116 of a pallet base 114. The gripping segment 128 of the hook is inserted through the openings 142 used for forklift tines in base 114, and the hook is pulled forward to engage base supports 116.

The use of the spreadable arms allows the hook to be slid into the pallet and positioned in the grappling position, as illustrated in FIG. 7, without the need for a person to enter the container. In a fully packed container, it may not be possible for a worker to enter the container because there isn't room. Thus, the hook can be properly positioned from the edge of the open container.

The bolt 130 prevents the tendency of the hook arms 124 to move towards each other when the cable begins to pull the pallet out of the container. That is, the tendency, for the angle defined by the two arms 124 and pivot 126 to narrow after the hook is being pulled under stress from the winch cable. The tendency of the arms to move together would put lateral mechanical stress on the pallet and could cause damage to the pallet.

In an embodiment of the present invention the platform may be equipped with wheels and can be easily moved and positioned in contact to the shipping container. In an embodiment as shown, the platform only has jacks and non-skid feet, and can be moved into position with a forklift.

In operation, the container 104 on a trailer 120 loaded with at least one pallet is parked at an approximately level orientation, without removing the pallet from the trailer. The roller platform 100 is moved into position so the edge 166 of the platform distal to the winch is in contact with the floor of the container. The jacks 106 of the platform 100 are adjusted to adjust the height of the platform, so the platform is approximately level and even with the floor of the container. A latching system may be employed to secure edge 166 of the platform to the base of the shipping container.

Typically, pallets are box-like structures, in which two opposing sides are open, the other pair of sides have wall supports. Pallet walls are typically not continuous, and typically have a support 116 near the center and adjacent openings 142 that forklift tines are inserted into when the pallet is lifted and moved by forklift.

The hook 112, with bolt 130 in a fully open position, can be inserted into an open end of the pallet and positioned so that the hooks arms each engage a support 116 in the pallet base (FIG. 7). The positioning of the hook arms is facilitated by the pivot 126 at the apex of the hook arms. Once the hook is positioned so the prongs 128 are in good contact with the pallet support 116, the bolt 130 can be tightened to fix the angle of the arms of the hook and prevent the arms from tending to move together. By grappling the pallet near the center, the hook has good mechanical advantage once the extraction operation starts.

Once the hook is in position, the winch is activated to pull (extract) the pallet out of the container. Shipping containers may have greased floors to allow the pallet to slide more easily than if not greased. When the pallet reaches the roller platform 100, the pallet slides easily on the rollers 102. Once the pallet is fully out of the container, a forklift can lift up the pallet and move it. Thus, the forklift lifts the pallet without the need for a loading dock, or the need to lower the entire shipping container off the trailer onto the ground, or to use an ungainly ramp so a forklift can enter the container.

Figure 8:
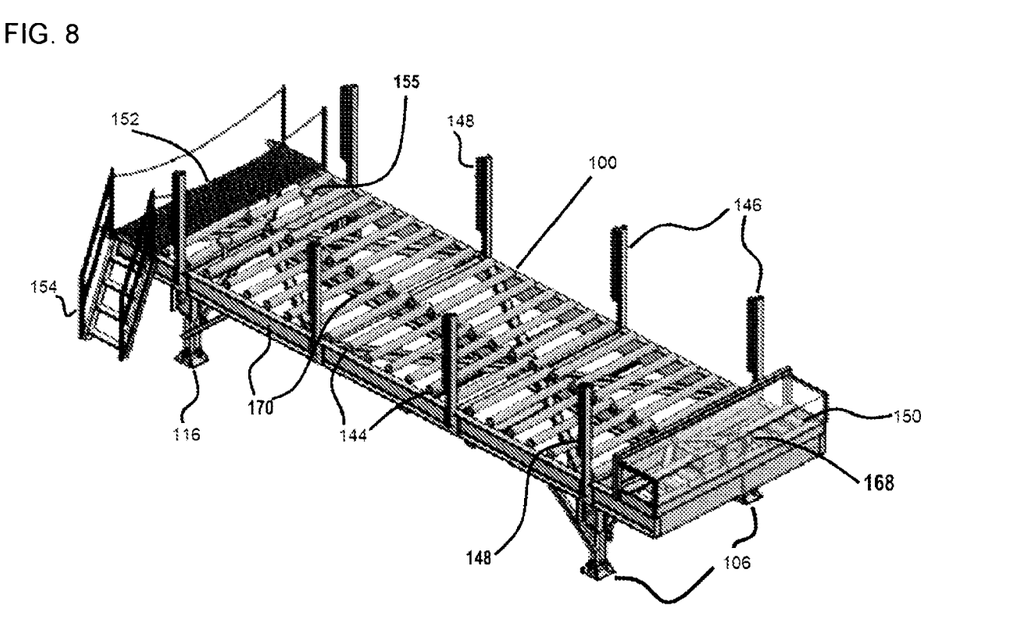
FIG. 8 shows an isometric view of an embodiment of the present invention with two rows of interlocking rollers.
Figure 9:
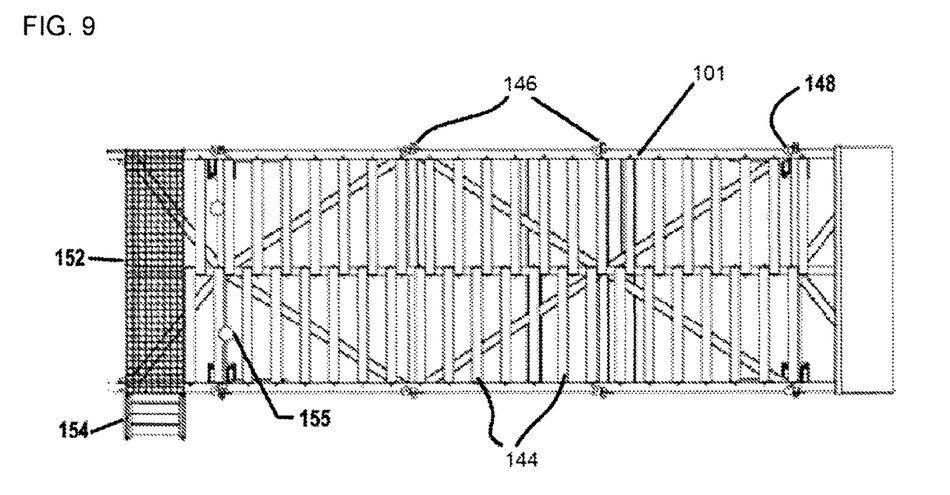
FIG. 9 is a top view of the embodiment of the present invention shown on FIG. 8.
Figure 10:
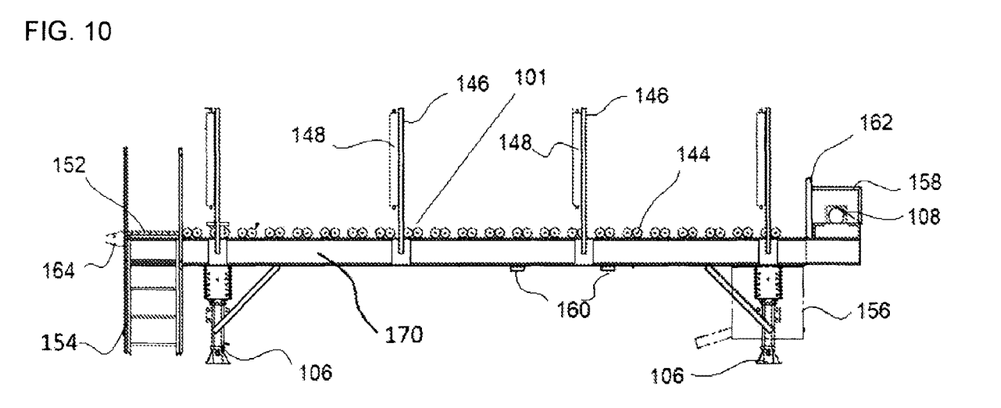
FIG. 10 is a elevation side view of the embodiment of the present invention shown on FIG. 8.

In another embodiment of this invention, as shown in FIGS. 8-10, a platform 101 is the full width of a shipping container and may have two alternating rows of rollers 144, where each roller spans from an outer edge of the platform to the center longitudinal axis of the platform as shown on FIGS. 8 and 9. As shown in FIGS. 8-10, platform 101 employs I-beam supports 170 (three are shown) as an alternative to the truss 134.

In an embodiment, the platform 101 is equipped with movable winch 168, which can for example be manually slid over rollers 150 positioned perpendicular to the platform's longitude, i.e., the winch is slidable on a latitudinal axis on the end of the platform distal to the shipping container. The alternating roller arrangement allows two pallets, each half the width of the shipping container, to be pulled out and positioned one next to the other on the platform. In order to avoid unnecessary mechanical stress during the extraction process, the winch cable should be aligned with the pallet being extracted so the cable pulls the pallet straight out of the container. The slidable winch can be positioned to pull the pallet straight out of the container.

The platform 101 in an embodiment may include a plurality of guiding posts 146, shown with vertical rollers 148 attached to them, which keep the pallet on the platform, without obstructing its sliding towards the winch end of the platform. The winch 108 on FIG. 8 is shown in a housing 158.

In an embodiment of the present invention as shown in FIGS. 8-10, the platform is equipped with a ladder 154 and a grating surface 152, which allows a user to climb on the platform and attach the grappling hooks 128 to the pallet base 116. The grating 152 may be made for example from reinforced fiberglass. Once the grappling hooks 128 are attached to the pallet base 116, the pallet can slide over the grating to the rollers 144 which lay on the platform 100. In an embodiment, the pallet may not contact the grating. Rather, the pallet spans the edge of the container to the rollers 144.

In an embodiment, the platform 100 or 101 may be equipped with one or more pulleys 155 that can engage the cable during the extraction and swivel the pallet slightly so it is properly aligned and directed straight onto the platform. This solves the problem of pallets and cargo shifting in transit, which can result in the cargo being pressed against the container side wall. If this happens, removing the pallet with the inventive method can be a problem because sliding the cargo in contact with the wall of the container can damage the cargo. The swiveling mechanism can be a pulley that engages the cable pulling the pallet out of the container and is configured to direct the force pulling the pallet towards the center of the roller bed and away from the wall of the container. In an embodiment, the swiveling pulleys are removably attached to the platform, and may be removed once the pallet is engaged and moved in the desired direction.

In an embodiment of the present invention, the winch 108 or 168 has an electric or hydraulic motor 156. FIG. 10 shows enclosure 158 which can house a hydraulic drive unit. The winch can be protected by a stop frame 162 and a winch housing 158.

In the embodiment shown on FIG. 10, the platform 101 is equipped with forklift tine enclosures 160 on the underside of I-beam supports 170 which can be used lift and move the platform 100 or 101 with a forklift. A forklift can be used to maneuver the platform 101 into position adjacent to a container 104. In an embodiment, when the platform is in position, container guide plates 164 (one each side of the platform) may be provided to align the platform 101 with the container 104. In an embodiment, the platform 100 or 101 may be lifted onto a truck with a forklift for long distance transport.

DRAWINGS LEGEND

| | |
|---|---|
| 100 | Platform |
| 101 | Platform full width |
| 102 | Conveyor Rollers |
| 104 | Shipping container or box truck body |
| 106 | Jacks (adjustable legs) |
| 108 | Winch |
| 110 | Cable |
| 112 | Two Prong Hook |
| 114 | Pallet base |
| 116 | Pallet Base support |
| 118 | Palletized Cargo |
| 120 | Trailer |
| 122 | Doors |
| 124 | Hook Arms (prongs) |
| 126 | Pivot on hook |
| 128 | Grappling hook at distal end of each hook arm |
| 130 | Hook Bolt |
| 132 | Loop |
| 134 | Truss System |
| 136 | Ground |
| 138 | Pallet Walls |
| 140 | Pallet Interior/Center Support |
| 142 | Openings |
| 144 | Alternating rows of rollers in full width platform |
| 146 | Guiding Poles |
| 148 | Vertical Rollers |
| 150 | Winch Rollers |
| 152 | Grating |
| 154 | Ladder |
| 155 | Removable Swiveling Mechanism/Pulley |
| 156 | Engine/Motor on winch |
| 158 | Winch Housing |
| 160 | Fork Tynes |
| 162 | Stop Frame |
| 164 | Container Guide Plate |
| 166 | Proximal edge of platform aligned with floor level of shipping container |
| 168 | Movable winch |
| 170 | I-beam supports on platform 101 |

The invention claimed is:

1. A system for unloading palletized cargo from an intermodal shipping container, comprising:
   a. a platform comprising conveyer rollers, wherein the platform has a proximal edge aligned with the floor of a shipping container with the shipping container doors open, and the wherein the rollers are aligned parallel to the proximal edge;
   b. wherein the platform is supported by four jacks that can be adjusted such that the platform is level and wherein the rollers are at the exact height of the floor of the container;
   c. wherein a winch is mounted on a distal edge of the platform, wherein the winch comprises a motor and a cable;
   d. wherein the winch cable is connected to the apex of a two-prong hook;
   e. wherein the hook has a distal end pointed away from the winch, and a proximal end pointed towards and the winch, and wherein the hook has a V-shape with two prongs with grappling hooks at the distal end of each prong, and a pivot at the apex of the V-shape at the proximal end of the hook;
   f. wherein the prongs of the V-shaped hook can contract and expand around the pivot in the apex of the hook;
   g. wherein the prongs of the hook are inserted into the base of the pallet and the hook is expanded so that the grappling hooks of each prong engage a base member of the pallet; and
   h. wherein the winch is activated and the winch cable pulls the pallet out of the container onto the roller of the platform.

2. The system of claim 1, wherein the hook further comprises an adjustable bolt that controls the spreading of the prongs around the pivot in the hook apex.

3. The system of claim 1, wherein the platform is equipped with a plurality of guiding posts and vertical rollers on both sides of the platform.

4. The system of claim 1, wherein the platform is equipped with one or more pulleys that engage the cable to swivel a pallet, wherein the one or more pulleys are removably attached to the platform.

5. The system of claim 1, wherein the platform is the full width of the container.

6. The full width platform of claim 5, wherein the platform has two alternating rows of rollers, wherein each roller spans from an outer edge of the platform to the center longitudinal axis of the platform.

7. The full width platform of claim 5, wherein the winch is slidable along a latitudinal axis on the distal end of the platform with respect to the shipping container, such that the cable can be positioned to pull a pallet out of the container on a longitudinal axis of the platform.

8. A method of extracting palletized cargo from an intermodal shipping container comprising the system of claim 1.

\* \* \* \* \*